Nov. 2, 1937.  F. E. WOLCOTT  2,097,681
COFFEE MAKER
Original Filed Oct. 7, 1931  6 Sheets-Sheet 1

INVENTOR
FRANK E. WOLCOTT
BY
ATTORNEY

Nov. 2, 1937.  F. E. WOLCOTT  2,097,681
COFFEE MAKER
Original Filed Oct. 7, 1931  6 Sheets-Sheet 2

INVENTOR
FRANK E. WOLCOTT
BY
ATTORNEY.

Nov. 2, 1937.        F. E. WOLCOTT        2,097,681
                     COFFEE MAKER
            Original Filed Oct. 7, 1931    6 Sheets-Sheet 3

Fig. 4.

INVENTOR
FRANK E. WOLCOTT
BY
ATTORNEY.

Nov. 2, 1937.  F. E. WOLCOTT  2,097,681
COFFEE MAKER
Original Filed Oct. 7, 1931   6 Sheets-Sheet 4
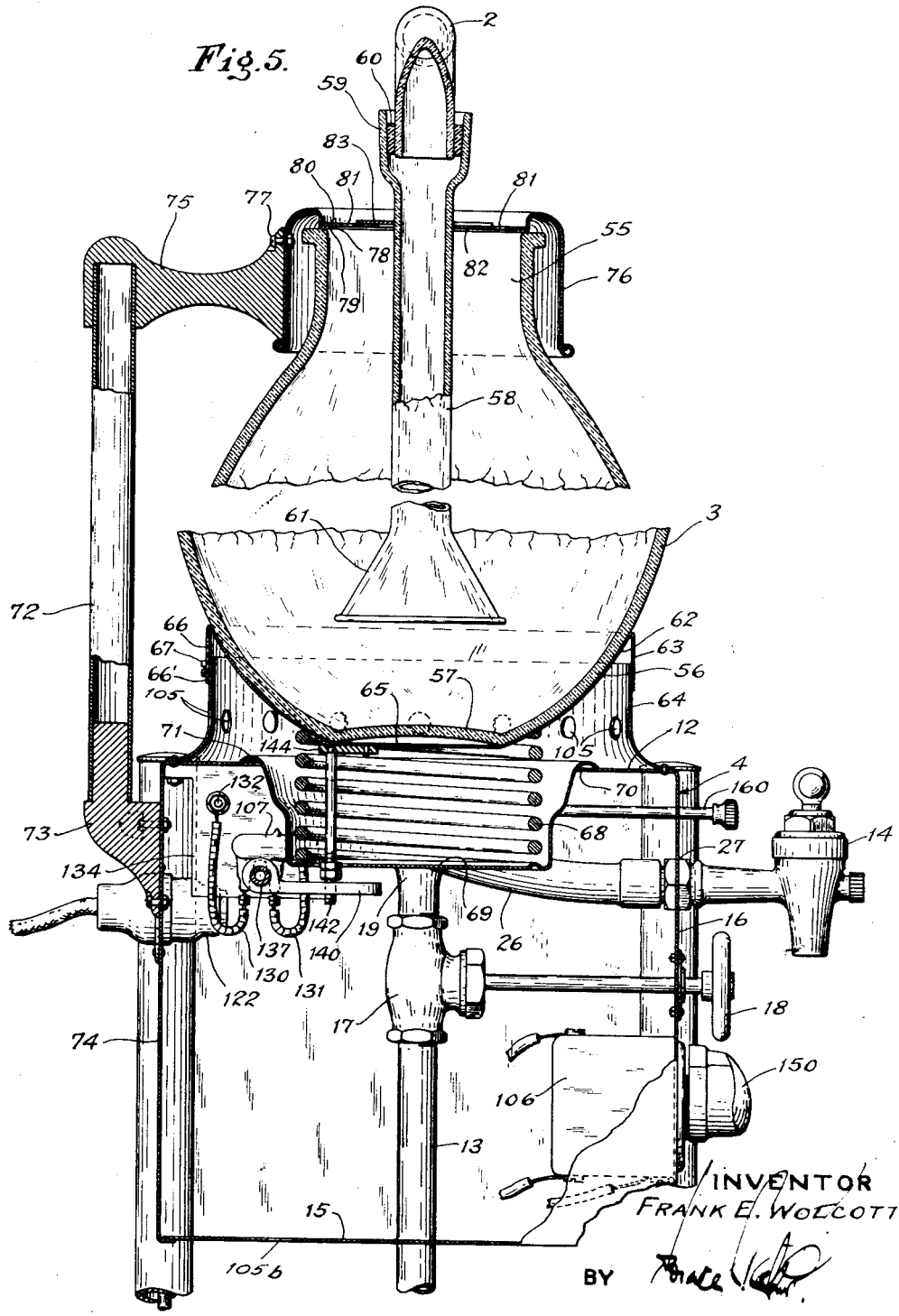
INVENTOR
FRANK E. WOLCOTT
BY
ATTORNEY.

Nov. 2, 1937.  F. E. WOLCOTT  2,097,681
COFFEE MAKER
Original Filed Oct. 7, 1931   6 Sheets-Sheet 5
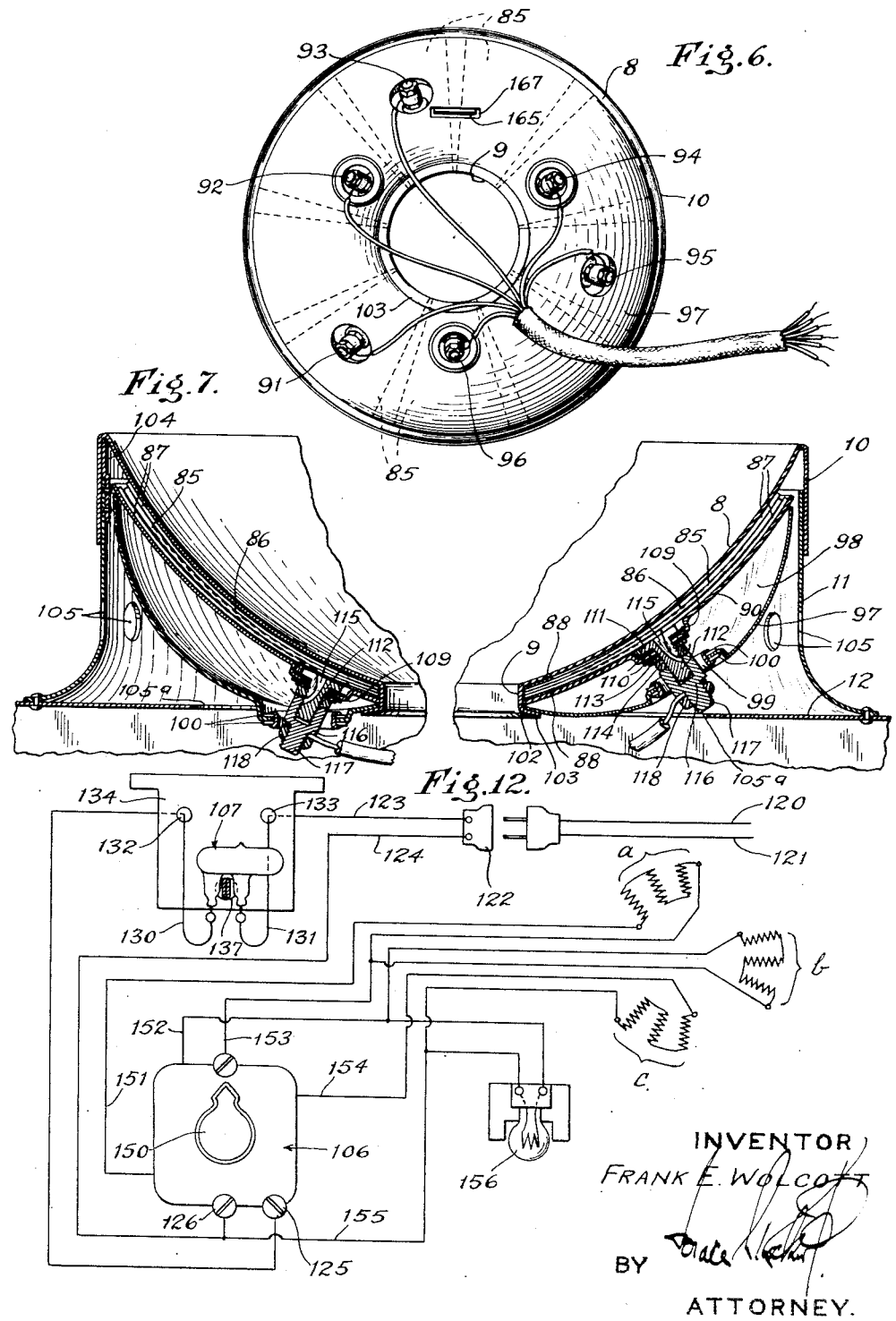
INVENTOR
FRANK E. WOLCOTT
BY
ATTORNEY.

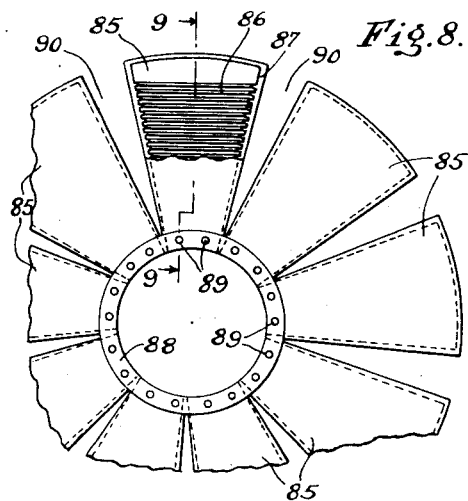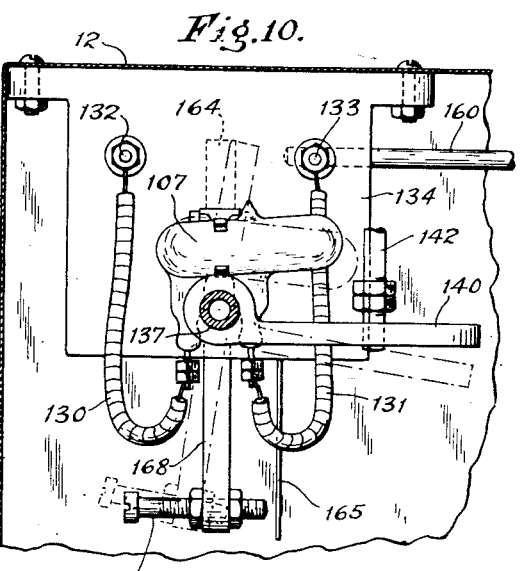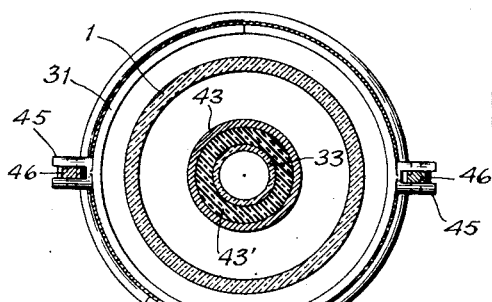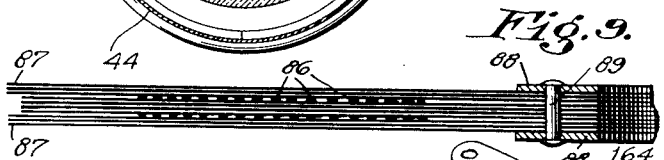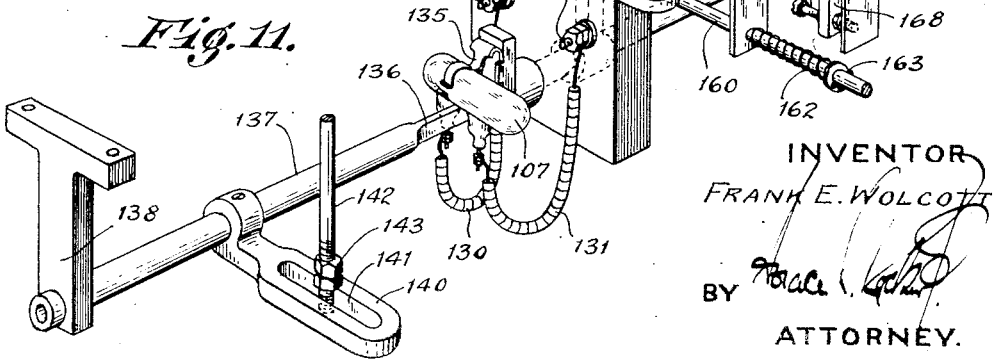

Patented Nov. 2, 1937

2,097,681

UNITED STATES PATENT OFFICE 2,097,681

COFFEE MAKER

Frank E. Wolcott, West Hartford, Conn., assignor, by mesne assignments, to The Silex Company, a corporation of Connecticut (1936)

Application October 7, 1931, Serial No. 567,453
Renewed April 13, 1936

34 Claims. (Cl. 219—43)

My invention relates to coffee makers.

It has among its objects to provide an improved coffee maker, especially and more particularly an improved coffee maker adapted for restaurant use and which is of the vacuum type adapted to transfer the heated water in one receptacle to the ground coffee in another receptacle and automatically return the brewed coffee to the first mentioned receptacle from which it is dispensed. Further objects of my invention are to provide such an improved coffee maker adapted to utilize glass, as distinguished from the metal urns now used, and accordingly minimize objectionable flavoring of the coffee by contact with metal, while also providing such a coffee maker wherein the steps in the whole coffee making operation are visible in such manner as to transform the coffee maker from an unattractive purely utilitarian piece of equipment into an attractive object of lively and continued interest to the restaurant patrons. A still further object of my invention is to provide an improved coffee maker of this type provided with improved automatic controlling means for insuring the exact timing of the coffee making operation so that for a given amount of coffee and water, brewed coffee of exactly the same strength and quality may be obtained each and every time, all in such manner as to minimize the present objectionable results obtained where an operator is required to use his own judgment and is frequently busy or forgetful. Further objects of my invention are to provide such a coffee maker having improved controlling mechanism for the heating means operative automatically after a predetermined contact of the boiling water and the coffee to turn off the heat, and also improved co-operating controlling mechanism operative thereafter to keep the brewed coffee hot while also being automatically operative when the level of the brewed coffee in the dispensing bowl falls below a predetermined limit to turn off the heat under the same. A still further object of my invention is to provide an improved coffee maker structure comprising an improved arrangement and construction of receptacles having an improved siphon connection and arranged in an improved and attractive manner, and having improved water supply and coffee dispensing connections to one of the receptacles, improved heating means associated with the latter, improved connections with the ground coffee containing receptacle enabling the latter to be readily removed and replaced, improved heat controlling connections controlled by the weight of the liquid in the latter receptacle, improved heat controlling means operable to permit the brewed coffee to be kept hot, and improved thermostatic means associated with the dispensing receptacle for turning off this heat automatically, as well as improved resetting mechanism for the heat controlling switch, while all of the above mentioned mechanism is mounted and arranged in an improved manner on an improved base. These and other objects and advantages of my improved construction will, however, hereinafter more fully appear.

In the accompanying drawings I have shown for purposes of illustration one embodiment which my invention may assume in practice.

In these drawings,—

Fig. 4 is a vertical sectional view on line 4—4 of Fig. 2, showing the heating and dispensing bowl in section, together with the heating means and the supply and discharge connections at opposite ends of the bowl;

Fig. 5 is a vertical section on line 5—5 of Fig. 2, showing the coffee containing or brewing bowl in section, with its supporting means and the switch actuating connections at one end thereof and the supply and discharge connections at the other end thereof;

Fig. 6 is a bottom plan view of the heater containing housing below the heating and dispensing bowl;

Fig. 7 is a vertical sectional view of the structure shown in Fig. 6, the view being taken on line 7—7 of Fig. 3;

Fig. 8 is a detail view of the heating element, a portion of the insulation on one of the radially disposed resistance carrying members being broken away to expose the resistance wire;

Fig. 9 is a detail sectional view on line 9—9 of Fig. 8;

Fig. 10 is a sectional view on line 10—10 of Fig. 3 showing the mercury controlling switch and its connections;

Fig. 11 is a perspective view showing the switch controlling mechanism;

Fig. 12 is a wiring diagram, and

Fig. 13 is a section on line 13—13 of Fig. 4.

Figure 1:
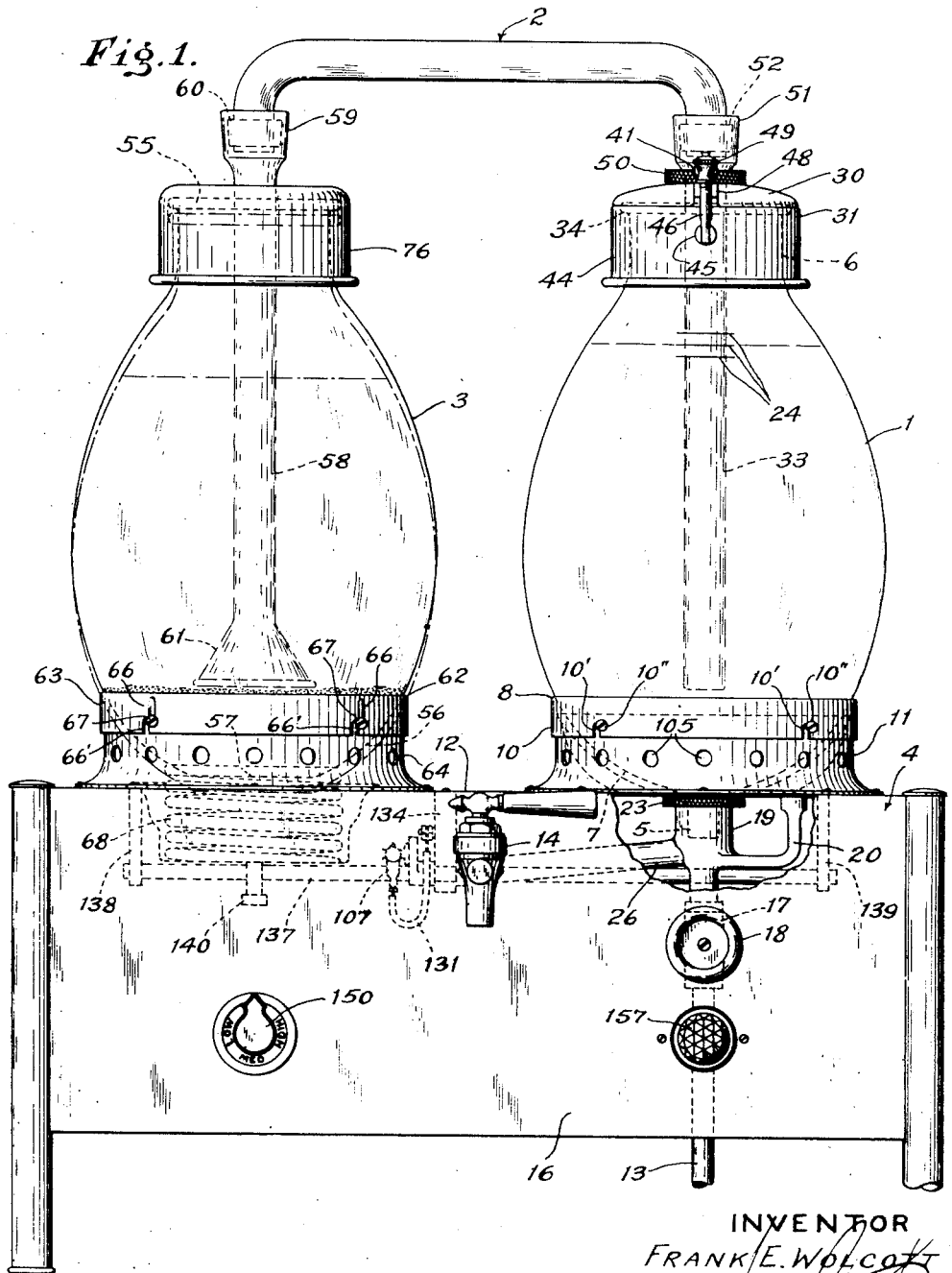
Figure 1 is a side elevation of a complete coffee maker constructed in accordance with this embodiment of my invention.
Figure 2:
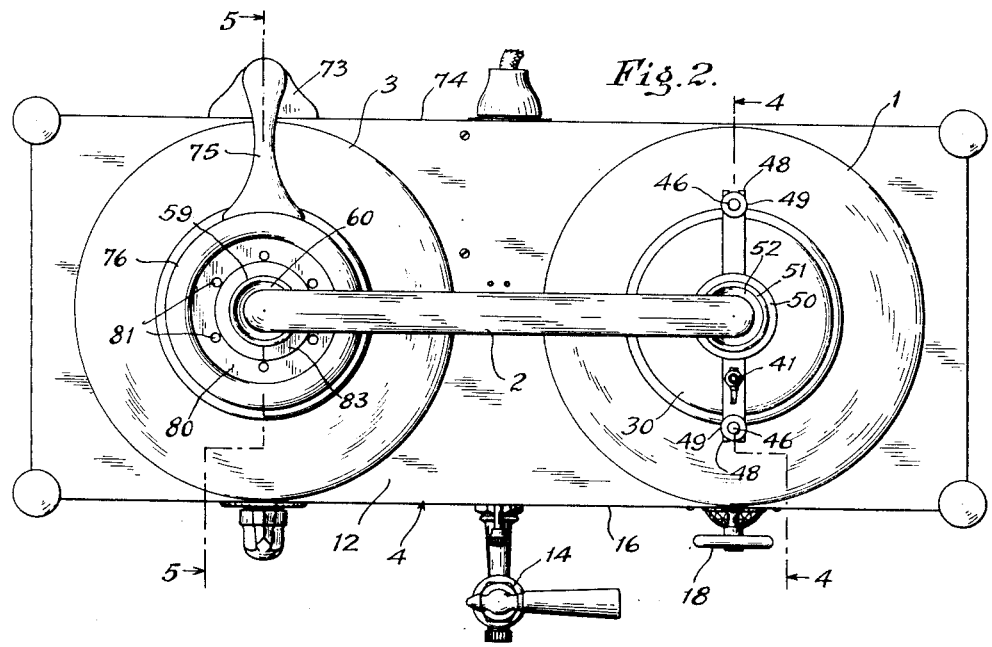
Fig. 2 is a plan view of the same.
Figure 3:
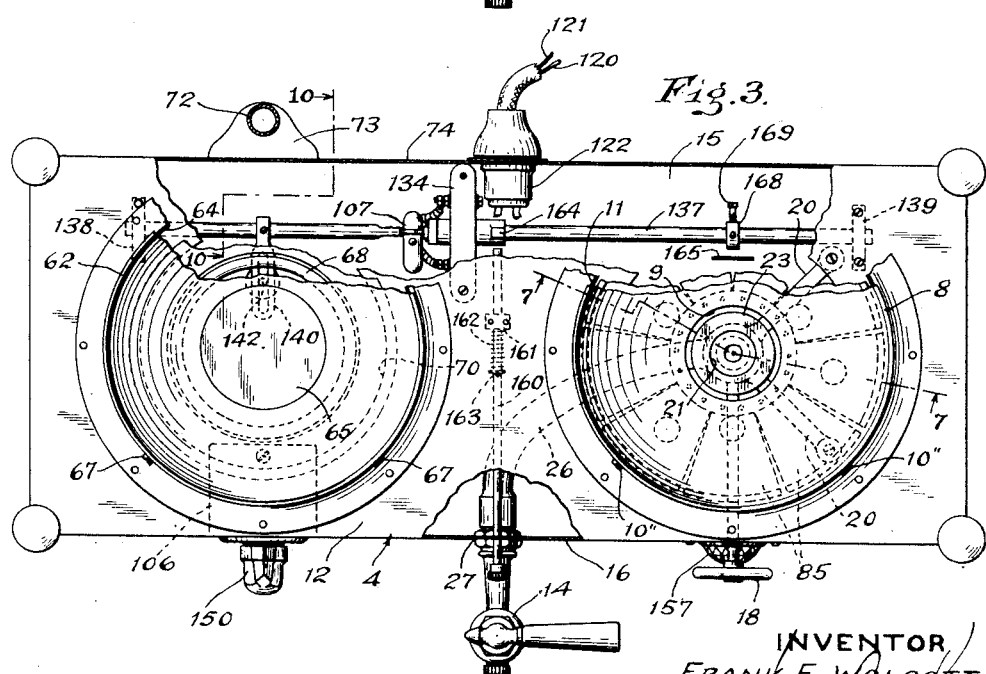
Fig. 3 is a plan view with the bowls removed and portions of the base broken away to facilitate illustration.

In this illustrative construction I have shown, generally speaking, a vacuum type coffee maker comprising an improved bowl 1, which is the water or heating and dispensing bowl, connectable by an improved connection, generally indicated at 2, to another laterally spaced bowl 3 which is the bowl containing the ground coffee or what may be called the coffee or brewing bowl, my improved coffee maker having these bowls both mounted on an improved support 4, while the bowl 1 has associated with the same improved heating means, hereinafter described, and each of the bowls has associated with the same improved controlling means, hereinafter described, for said heating means, and the base 4 also carries improved controlling and indicating mechanism as well as improved water supply and coffee dispensing connections for the bowl 1, all hereinafter more fully described.

Referring more particularly to the bowl 1 and its supporting means, it will be noted that the same is herein of glass and of an elongated oval shape, and provided at its lower end with a depending short axial inlet and discharge connection 5 and at its upper end with an enlarged neck or mouth 6. Moreover, it will be noted that the lower rounded end 7 of this bowl above the portion 5 is seated in a concave seat member 8 on the base 4. As shown, this seat member 8, which herein is otherwise imperforate, also has an axial sleeve portion 9 therein through which the portion 5 extends, and also has a depending flange 10 enclosing an upstanding annular portion 11 on one side of the top member 12 of the base 4 in such manner as to provide an adequate stationary support for the bowl in the vertical position of the latter illustrated, while providing a housing for the bowl heating means, hereinafter described, between the members 8 and 11. As shown, the member 8 is also locked on, while being removable at will, by a series of bayonet slots 10' in the flange 10 and a series of pins 10" carried on the member 11.

Operatively connected to the portion 5 at the bottom of this bowl are improved water supply and coffee dispensing connections. The same herein are carried by the base 4, and include a water supply pipe 13 and a brewed coffee dispensing spigot or faucet 14. Of these, the water supply pipe 13 extends vertically up through the bottom 15 of the base 4 and is adapted to supply water to the bowl 1 whenever desired, while the dispensing spigot 14 extends laterally from and through a front wall 16 of the base and is adapted to draw off the brewed coffee from the bowl 1 at any time after the completion of the coffee making operation.

Referring more particularly to the water supply connections, it will be noted that the water supply pipe 13 opens directly into the portion 5 on the bowl 1, while the flow through the pipe 13 is controlled by a suitable controlling valve 17 operable by a controlling member 18 on the front wall 16 of the base. As shown, the portion 5 on the bottom of the bowl extends into a connecting member 19 having supporting arms 20, supported by the top of the base 4. Herein, this member 19 also has a passage leading from the valve 17 and opening into an enlarged passage 21 into which the portion 5 extends, while a suitable packing 22 engages the outside of the portion 5 slightly above its lower end to seal the connection. This packing 22 is also preferably held in place by a suitable packing adjusting gland 23 through which the portion 5 extends axially below the opening 9 in the member 8, while the gland 23 is also preferably spaced from contact with the portion 5 of the glass bowl as shown. Thus it will be evident that when it is desired to supply water to the bowl 1, it is only necessary to open the valve 17 by its control member 18 and close the same when the water level in the bowl has reached any selected one of a series of different level indications or graduations 24, herein three, near the top of the bowl, Fig. 1.

As regards the dispensing connections, it will also be noted that the member 19 has a laterally opening aperture 25 above its connection to the valve 17 and communicating with a pipe 26 which leads from the member 19 to the front wall 16 of the base at a point near the top of the latter and between and below the bowls 1 and 3, where it is connected through suitable connecting means 27 to the dispensing spigot or faucet 14 heretofore referred to. Thus it will be evident that when it is desired to dispense brewed coffee from the bowl 1, after, of course, the valve 17 has been closed by its controlling member 18 to shut off the supply of water, it is only necessary to open the faucet 14 to draw off coffee as desired from the bowl 1 into any cup or other receptacle disposed beneath the faucet.

Operatively associated with the upper end of the bowl 1 is improved means for sealing the same and improved means for transferring heated water from the bowl 1 to the bowl 3 and returning the brewed coffee to the former bowl. Herein, it will be noted that the first means includes removable connections 30, 31, adapted to be clamped on the upper end of the bowl 1, while the transfer connections include a vertically disposed pipe 33 preferably of glass and carried by the member 30 and having a suitable sealed connection therewith, while also communicating with the glass connection, generally indicated at 2, which is in turn connected to the bowl 3.

Referring more particularly to the members 30, 31, and their mounting on the bowl top, it will be noted that the top of the bowl is herein provided with a lateral flange 34 and that packing members 35 and 36 carried by the members 30, 31, as hereinafter described, engage this flange. More particularly, it will be noted that the top member 30 herein has a generally convex or crowned top and that it is apertured to permit the insertion and removal of the member 33. Herein, it also has an annular packing containing groove 37 and a depending inner flange 38 adapted to enter into the open end 6 of the bowl and engage the inside of the flanged top thereof, and also another outer depending portion 39 adapted to pass down below the top of the flange 34 on the latter. It will also be observed that this member 30 has a wider annular passage 40 inside the depending member 38 and that a petcock 41 is carried on the top surface of the member 30 and connected through a port 42 with this annular passage, while the member 30 is also provided with an elongated depending packing housing sleeve 43 coaxial with the member 33 and through which the latter extends as hereinafter described. As shown, the member 31 is of two piece construction and disposed beneath the member 30 and spaced laterally out of contact with the upper portion or neck of the bowl 1. Herein it also includes a depending shield 44, forming a continuation of the crowned top of the member 30 and extending down from the packing 36, and this shield 44 is apertured laterally and has the bifurcated projections 45 on the member 31 projecting through opposite sides of the same. Also, as shown, these projections 45 carry pivoted between them threaded locking members 46 which in turn are receivable in corresponding slots 47 in corresponding superimposed projections 48 on the member 30 and also carry clamping nuts 40 adjustable to clamp the parts together or release the same. Thus, it will be evident that, while the members 30 and 31 are readily removable when desired, the upper end of the bowl will be securely clamped and sealed by the members 30, 31 and the packings 35, 36 when the clamps are in position, while the pressure in the bowl may be determined by suitable adjustment of the petcock 41, as hereinafter described.

Referring more particularly to the pipe 33 and its seals and connections, it will be noted that this pipe is slidably mounted in a packing or seal in the portion 43 on the member 30 and extends down into the bowl to a point substantially opposite the top of the concave seating member 8. It will also be noted that it extends up out through the packing holding member 43, and that a suitable packing 43' seated in this member 43 acts to seal the pipe 33 in position in the portion 43, the pressure of the packing being adjusted as desired by a packing gland 50 threaded in the upper end of the member 43. As shown, the pipe 33 is also provided with an enlarged portion 51 on its upper end and has a packing member 52 seated therein and sealing this connection between the member 33 and a connecting member forming a part of the siphon connection and herein indicated at 2. Thus it will be evident that the members 2 and 33 may be readily disconnected at will and the member 33 may be both bodily withdrawn from the bowl with the member 30 and separated from the latter. It will also be evident that when water in the bowl 1 is brought to a boil, and the petcock 41 in the member 30 is then closed, the steam will generate pressure in the top of the sealed bowl 1 forcing the water in the latter up through the pipe 33 and laterally through the connecting pipe 2 to the bowl 3 to which it is supplied through connections hereinafter described.

Referring next to the bowl 3 and its connections to the bowl 1, it will first be noted that the bowl is also of glass and is substantially the same shape as the bowl 1 and provided with a corresponding flanged open upper end or neck portion 55, and a correspondingly rounded lower end 56. Here, however, instead of a bottom inlet and outlet connection corresponding to the connection 5 on the bowl 1, this portion is provided with a closed bottom 57. Here it will also be observed that a tube 58, preferably also of glass, is extended axially down into the bowl 3 to a point adjacent the bottom thereof. This tube, like the tube 33, is also provided with an enlarged upper end 59 carrying therein a packing 60 corresponding to the packing 52 and adapted to receive the opposite end of the connection 2. Here, however, this member 58 is preferably provided with a flared lower end or enlarged mouth 61. Thus it will be evident that when this bowl 3 with ground coffee in the latter, is suitably supported on the base 4, as hereinafter described, and the member 58 is suitably supported as likewise hereinafter described, the bowl is adapted to receive the boiling water from the bowl 1 through the connection 2 and the member 58, while subsequently, when the bowl 1 is cooled sufficiently to create a vacuum condition therein, the member 58 will act as a return means returning the brewed coffee from the bowl 3 through the connection 2 to the bowl 1 to be dispensed.

Associated with the bowl 3 are improved supporting means carried by the base 4. These herein include a concave seat member 62, generally corresponding to the member 8 previously described, and having a flange 63 overlapping a member 64, generally corresponding to the member 11, and similarly carried on the top member 12 of the base 4, but at the opposite end of the latter from the member 11 and spaced laterally from the latter. Here, however, it will be noted that the member 62, instead of having an axial aperture therein, has a closed bottom 65. Moreover, it will be noted that the flange 63 has vertical slots 66 therein receiving laterally pins or screws 67 on the member 64, and adapted to permit the bowl 3 and its supporting member 62 to be moved vertically within the limits of the slot relative to the member 64, while also permitting locking on and removal of the member 62 through bayonet slots 66' also cooperating with the pins 67. It will also be noted that a coiled spring 68 is disposed beneath the member 62 around the bottom 65 thereof, and that this spring acts as a resilient support for the member 62 and has its opposite end supported on a depending cup member 69. As shown, this latter member extends down through an aperture 70 in the top 12 of the base, coaxial with the bottom of the bowl and the spring, and has an overturned supporting flange 71 on its upper end resting on the upper surface of the top 12 around the apertures 70. Thus it will be evident that when a given weight of water has been supplied to the bowl 3, the latter will automatically move downward to compress the spring 68 within the limits established by the slots 66 and also actuate improved heat controlling mechanism for the bowl 1 hereinafter described. Similarly, when the weight of the liquid in the bowl 3 has been decreased by the return of the same to the bowl 1, it will be evident that the bowl 3 will automatically move upward to resume its normal up position, in which it is held by the spring 68.

In view of this vertical movement of the bowl 3, improved carrying or mounting means for the member 58 are provided. These herein include a standard of any suitable type, as, for example, a rod 72 carried on a bracket 73 attached to the back 74 of the base 4 and also carrying at its upper end a bracket 75 carrying guiding and positioning means associated with the upper end of the bowl 3 and the member 58. Herein the latter means include a depending shield 76, generally similar in contour to the shield 44 previously described, and attached at 77 to the bracket 75. As shown, this shield is provided with an axial aperture 78 and a depression above the same presenting a peripheral flange 79 surrounding the member 58. This flange in turn is seated on the upper flanged end of the bowl neck 55, and itself provides a seat for an annular member 80 having a series of apertures or perforations 81 therein providing communication between the inside of the bowl 3 and the atmosphere. As shown, this member 80 is also provided with an axial aperture 82 surrounding the member 58 and spaced therefrom in such manner as to adapt it to use with various different members 58 despite the variations in the size thereof usual in glass manufacture. Moreover, it will be noted that another annular member 83 smaller in outside diameter than the member 80 is supported thereon in such manner as to overlie the axial aperture 82 therein, while exposing the atmospheric connections or perforations 81. This member 83, it will also be noted, is a split spring member and snugly engages the member 58 in such manner as to provide a support for the same and that end of the member 2. Thus it will be observed that, while the bowl 3 is free to move vertically, as previously described, the member 58 is supported at all times by the connections described, while the inside of the bowl is at all times in communication with the atmosphere. Also it will be evident that whenever desired, the bowl 3 may be readily removed.

The mechanism so far described may be heated by various heating means, but I preferably provide improved electrical heating means therefor disposed below the bowl 1, and also preferably provide improved controlling means for these heating means associated with the bowl 3 and controlled by the latter as it moves vertically, as previously described.

Referring first to the heating means for the bowl 1, it will be noted that these include a series of radially disposed resistance elements 85 carrying resistance wires 86 and enclosed in mica strips 87. As shown in the plan view in Figure 8, each of these elements 85 is provided with a curved outer edge and has its sides tapering toward a common axis, but it is cut off at its inner end short of the axis and there connected between a pair of connecting rings 88 by any suitable means, as, for example, rivets 89. Thus, it will be noted that the several elements are spaced apart by V-shaped spaces 85a widening toward the periphery of the heating unit, formed by the combined and connected elements. Thus, it will be noted that a unitary structure is provided having flexible radially extending elements 85 adapted to conform to the bottom of the member 8.

As regards the mounting of this unit, it will be noted that the rings 88 are herein disposed around the depending axial portion providing the opening 9 in the member 8, and that the several elements 85 are pressed against the lower surface of the member 8 by a pressure plate 90 carrying terminals 91, 92, 93, 94, 95 and 96, for certain heating elements, as hereinafter described. Moreover, it will be noted that a heat retaining plate 97 is substantially spaced below the pressure plate 90 in such manner as to provide an effective heat loss preventing chamber 98 between itself and the plate 90. This plate 97, in turn, carries insulated eyelets 99 insulated therefrom by suitable mica washers 100, which also provide apertures through which the terminals 91 to 96 extend. Herein also it will be observed that this plate 97 is concave and has its upper periphery engageable with the upper edge of the pressure plate 90, while the plate 97 is also provided with an axial aperture 102 disposed coaxially around the depending axial portion 9 of the member 8 and is held in place by a bent up flange 103 on the bottom of the portion 9. Here attention is also directed to the fact that the member 8 is supported on a series of spaced upstanding members 104, herein three, which project up between the member 8 and its flange 10 and are carried on and attached to the upper end of the member 11, all in such manner as to provide a rigid and effective heating construction when the parts are associated as described, the heating elements 85 being pressed firmly against the bottom of the member 8 on which the bottom of the bowl 1 is seated, while the members 104 cut down the possible heat flow from the bowl to a minimum and the member 97 and chamber 98 tend to prevent loss of heat below the heating elements.

Attention here is also directed to the fact that the construction is such as to permit quick cooling of the parts and resultant quick cooling of the bowl 1 after the current has been turned off in such manner as to expedite the automatic return of the brewed coffee from the bowl 3 to the bowl 1 and automatically effect this return after a normal infusion period, thereby automatically correctly timing the infusion. This action is further expedited and discoloration of the member 11 by excessive heat also minimized by the provision of a series of apertures 105 extending around the member 11, while a similar series of apertures 105' is also provided in the member 64 to prevent discoloration thereof. It will also be noted that the members 8, 9, 85, 90 and 97 all form a single assembly adapted to be inserted in the member 11 and locked in place by the bayonet connections 10', 10''.

Referring more in detail to the quick cooling structure provided, it will be observed that the same is such as to enable the desired normal infusion to be obtained without substantial upward air flow through the base acting upon the bottom of the bowl 1, and also one wherein, when this bowl is being heated or cooled, there can be no air flow which also passes up from the base through the heating unit and acts directly upon the bottom of the bowl, as taught by the prior art. Instead, with such an air flow impossible in view of the member 8, improved means are provided for lowering the temperature of the bowl 1 within the desired time limits usual in this art, by providing an improved heat radiating or dissipating structure associated with the resistance element and making it possible to set up a wholly new cooling air flow which acts on this new radiating structure in such manner as thereby to bring down the temperature of the bowl 1 sufficiently to insure the return of the brewed coffee to the bowl 1 within the desired time limits of a normal infusion. Here it will be observed that the heating means is such as to minimize heat storage and also enable the heating means to be very quickly brought up to heat following the initiation of current flow and also very quickly cooled following the cessation of current flow. In connection with this quick cooling, note also that the heat retaining member 97 of the heating assembly provides effective heat radiating means of relatively large area beneath the bowl 1 and so associated with the resistance as to expedite cooling. Moreover, attention is directed to the provision of improved means for maintaining this heat radiating member in constant communication with the atmosphere so that, despite the fact that no sufficient flow of cooling air to effect quick cooling can be delivered upward through the casing 4 and through the heating means directly on to the bottom of the bowl 1, quick cooling is still made possible by an induced flow of cooling air flowing through a new path and in sufficient quantity to take away the heat radiated by the resistance element and its supporting means within the desired time limits. Herein, these means include a series of apertures 105 in the casing member 11 which constantly communicate with the atmosphere and thus enable the heat from the heating means to be quickly dissipated from the member 97 following cessation of current flow. Further, it will be observed that the top member 12 of the base 4 is cut away around and beneath the member 97 at 105a in such manner as to provide free communication with the interior of the base 4. If desired, the base bottom member 18 may also be provided with apertures 105b therein.

As a result of this improved construction, it is made possible despite the exclusion of any substantial cooling air flow around and through the heating unit, to obtain the desired quick heating and cooling results, with the latter obtained by radiation from a part associated with the resistance element and so located relative to the means preventing the upward cooling air flow through the unit, herein below said means, as to enable a new and substantial induced flow of cooling air to be set up which takes away the heat radiated by the heating element so rapidly as to effect cooling of the bowl 1 within the desired infusion limits. Further, it will be noted that herein this new induced cooling air flow is also incapable of being interrupted even when the bowl is seated directly on the supporting surface of the heating assembly. In fact, even with the member 8 and the bowl 1 closing off all upward flow through the heating unit, it will be observed that quick heating and cooling within the usual time limits is obtainable.

In connection with the electric terminal connections for the heating unit, it will be noted that while the same may obviously assume different forms, in Fig. 6 the terminals 91 to 96 are disposed in pairs on adjacent elements 85 with a non-terminal connected or inside element between each of these pairs. Further, it will be noted that the elements 85 are connected in three series of three elements each with the elements in each series connected in series (see Fig. 12), and the terminals located between the two outside elements of each series of three elements. Thus each terminal has a conductor leading away therefrom and is also connected to the adjacent resistance element, while the current flows in series through the latter element and the next two adjacent elements and out through the cooperating terminal which is similarly connected to its adjacent element and also has a conductor leading away with the other conductor mentioned, through circuit connections, hereinafter described, to the controlling devices including manually adjustable three heat switch, generally indicated at 106 and an automatically operated switch 107, both also hereinafter more specifically described.

Referring more particularly to the terminal construction, it will be noted that the pressure plate has a series of protruding and apertured flange portions 109 therein, preferably at different distances from its axis as shown in Fig. 6 and also suitably insulated by inner and outer insulating washers 110. Moreover, it will be noted that in each instance the head 111 of a threaded plug 112 presses the inner one of these washers 110 against one side of the flange on the portion 109 while the threaded portion of the plug extends axially through the flange out of contact therewith. Herein, another washer 113 is disposed outside the outside mica washer 110 while a threaded member 114 is disposed outside this washer 113 and threaded on the plug 112. Moreover, it will be noted that the threaded member 112 is provided with a longitudinally extending groove 115 extending longitudinally of the inner end of its threaded portion and its head, which is adapted to provide a passage for the end of the resistance wire 86. Here it will also be noted that an internally threaded member 116 is threaded on the outer extremity of the member 112 and clamps the end of the resistance wire 86 between its own inner end and the member 114, while this member 116 is also provided with an externally threaded outer extremity 117 forming a binding screw and carrying a nut 118 for clamping thereto the conductor leading away to the controlling devices. Thus it will be evident that at the same time that the latter conductors may be readily connected to each of the terminals, and each terminal is insulated from the member 87 by its projection through an insulating eyelet 99, each terminal is both conveniently and effectively connected to its adjacent resistance element.

Herein each series of heating elements is connected to the line conductors 120, 121 through the medium of an improved circuit arrangement, hereinafter described, including the controlling switch 106, while current flow from the line is established by a plug 122 carried on the back of the base 4 and connected through conductors 123 and 124 to the terminals 125 and 126 of the switch 106, and flow through the conductor 123 to the switch 106 is also controlled by the automatically operated switch 107, which is in turn controlled by the downward movement of the bowl 3 previously described.

Referring more particularly to the automatically operated switch 107, it will be noted that this switch 107, while not limited thereto, is herein in the form of a mercury switch and mounted for tilting to make or break the circuit therethrough while operative connections are provided between the switch and bowl 3 to tilt the switch and break the circiut whenever the bowl 3, as a result of a predetermined weight of heated liquid therein, depresses the spring 68 and assumes its bottom position relative to its support 64. As shown, the switch 107 has its terminals connected through flexible leads 130 and 131 to terminals 132, 133 in such manner as to form a series connection with the conductor 123. Also, it will be noted that the terminals 132, 133 are carried on a stationary depending insulating member 134 attached to the under side of the cover 12 of the base 4 at a point substantially midway between the ends of the latter, and herein between the spigot 14 and the spring 68. As shown, the switch 107 is also carried in a pivotally mounted clip 135 and has its depending terminals straddling a flattened portion 136 on a control rod 137 extending longitudinally of the base and suitably journaled in the member 134 and in supports 138 and 139, the arrangement being such that when the parts are in the position shown in Figure 11, current flow is established through the switch 107 and through the switch 106 to the heating unit, while when the rod 137 is rotated, the switch is tilted to interrupt current flow. Herein, it will also be noted that the rod 137 carries a laterally extending arm 140 having a slot 141 therein adapted to receive the lower end of a vertically disposed controlling member 142, while the arm is also adapted to be engaged by a projection, herein in the form of nuts 143 on the member 142, and be depressed thereby to rock the rod 137 and open the switch circuit whenever the rod 142 is depressed to the required extent. It will be noted that herein the upper end of the rod 142 is suitably connected to move vertically with a plate 144 which is in turn attached to the bottom 65 of the vertically movable bowl seating member 62 for the bowl 3. Thus, it will be evident that when a predetermined weight of liquid has been transferred from the bowl 1 to the bowl 3, i. e., sufficient to cause the spring 68 to be compressed to the desired extent, the member 142 will be similarly lowered and cause the lower nut 143 to engage and depress the arm 140, which will, in turn, rotate the member 137 and thereby tilt the switch 107 and accordingly cut off the heat from the various heating elements 85 acting on the bowl 1.

The switch 106 may be of various forms, and the switch construction per se is not a part of my invention. Thus a specific description of the switch structure per se seems unnecessary herein. It should, however, be noted that the switch herein includes a rotatable actuating and indicating member 150 movable from "off" position successively into "low", "medium" and "high" heat positions, indicated in Figures 1 and 12, and that the switch controls the current flow through connected switch leads 151, 152, 153, 154 and 155, in such manner that the member 150 controls the current flow through all of the resistance elements 85. Thus, with the three elements 85 comprising the group a in Fig. 12 connected to the conductors 151 and 153, the three comprising the group b connected to the conductors 152 and 153, and the three comprising the group c connected to the conductors 154 and 155, when the member 150 is in its "low" position, all of the three series, a, b and c, are connected in series and each equally heated to a "low" heat, while when the member 150 is moved to its "medium" position, two of the same are connected in parallel and brought to the same higher or "medium" heat, and when the member 150 is moved to its "high" position, all of the same are connected in parallel and brought to the same "high" heat. Attention is also directed to the fact that the switch 150 is conveniently carried on the front member 16 of the base 4 at a point below the bowl 3. Here, it will also be noted that a signal light 156, connected between the conductors 155 and 152, is also carried in a suitable housing disposed on and within the base 4, herein beneath the water valve control member 18 and behind a suitable lens, as, for example, a red lens 157, making the lighted lamp visible from the outside of the base. Thus it will be evident that whenever the switch 107 is closed, through the switch 106 and by adjustment of its control member 150, the heat supplied to the bowl 1 may be regulated as desired, while the light 156 will always show when the heat is on and also indicate, by its glow, what heat is being used.

Co-operating with the mechanism for automatically operating the mercury switch 107 is also improved manually operable resetting mechanism for that switch which it is necessary to operate before the switch 106 can be used to enable the heating elements 85 to keep the brewed coffee hot in the bowl and ready to be dispensed. Herein this mechanism includes a resetting member 160 operable from the front of the base 4 and reciprocable horizontally through the front wall 16 of the base 4 at a point behind the top of the spigot 14. As shown, this member or rod 160 is supported near its inner end in a bracket 161 depending from the top of the base 4 and also has a coiled spring 162 operating between this bracket and a washer and pin connection 163 on the rod, in such manner as normally to cause the member 160 to assume an outwardly projected or inoperative position. Further, it will be noted that the rod 137 also carries an upstanding projection 164 thereon which is adapted to be engaged by the inner extremity of this rod when the latter is pushed in, in such manner as to tilt the rod 137 and switch 107 back into a position re-establishing current flow through the switch 107. It will be evident that during the coffee making operation and so long as the predetermined weight of liquid remains in the bowl 3, pushing in of this reset member 160 will be ineffective. However, as soon as the brewed coffee in the bowl 3 has returned to the bowl 1, it will be evident that a momentary pushing in of the resetting member 160 will be sufficient to reset the switch 107 by tilting the same back into circuit closing position, while the rod 160 will be automatically returned by its spring to its normally projecting position. Thus obviously after the switch 107 has been thus reset after the return of the brewed coffee to the bowl 1, the actuating member 150 of the switch 106 may be freely adjusted as desired, as for example to keep the brewed coffee hot, the member 150 then being adjusted into its "medium" or "low" positions.

Operatively associated with the controlling mechanism and the switch 107 is also improved safety mechanism for preventing damage when the brewed coffee level in the bowl 1 falls below a predetermined point. This point may, of course, vary, but herein it is the top of the flange 10 on the bowl seat member 8. More particularly, it will be noted that a thermostatic member 165 of any usual bimetallic construction is suitably attached, as at 166, to the under side of the pressure plate 90 above the rod 137. Moreover, it will be noted that this thermostatic member 165 extends downward through a suitable slot 167 in the heat retaining plate 97, and further extends down past the rod 137 to a point below the same. Attention is also directed to the fact that a depending arm 168 is provided on the rod 137 at a point between the bracket 161 and the end support 139, and that this arm 168 carries an adjustable screw 169 adjustable laterally relative to the lower extremity of the thermostatic member 165 so that the operation of the latter may be adjusted for the desired temperature. Thus, when the parts are suitably adjusted, it will be evident that when the brewed coffee level in the bowl 1 drops below the top of the flange 10, the member 165 will be heated sufficiently to cause it to swing laterally into engagement with the end of the screw 169 and thereby also tilt the rod 137 and switch 107 to break the circuit through the latter. It will also be evident that while the parts will remain in this position and until they are intentionally reset by the member 160, the switch 106 will be inoperative, while the light 156 will also be out.

In the operation of my improved construction it will be evident that if a given amount of coffee, as, for example, a pound of the same, is in the bowl 3, and a given amount of water is in the bowl 1, exactly the same results will be obtained each time the coffee is made, through the automatic controlling means described, while the device will also be protected from damage by the co-operating automatic safety means described. Considering the operation more specifically, it will be understood that in the beginning of the coffee making operation, the ground coffee, for example, a pound, is preferably inserted in the bowl 3 before the same is mounted in the device. To increase convenience, two bowls 3 are provided for each device so that, after each coffee making operation, the bowl containing the grounds may be removed and the other containing the fresh coffee may be substituted therefor.

The desired filling of the bowl 1 with water will also obviously be readily effected by adjustment of the controlling member 18, the petcock 41 then being open, while the height of the water in the bowl 1 will depend upon the requirements of the trade of the particular restaurant, the water level coming up to one or another of the graduations 24, as desired. With the switch 107 in closed circuit position, the actuating member 159 of the switch 106 will then be moved to supply the desired amount of heat to the heating elements 85. Until the water in the bowl 1 comes to a boil, the petcock 41 is preferably left open to prevent premature transfer of some of the water while the latter is at a lower than boiling temperature and accordingly calculated to produce inferior coffee. When this petcock is closed, the steam generated in the bowl 1 will act upon the boiling water therein to force the same successively through the connections 33, 2 and 58 over the ground coffee in the bowl 3. This operation will continue until the weight of the water in the bowl 3 is sufficient to compress the spring 68 and lower the control rod 142 which will then depress the arm 146 to tilt the rod 137 and the switch 107 to break the circuit to the heating unit. Thereafter, when, after a normal infusion period, the bowl 1 and its associated parts have cooled sufficiently, a vacuum condition will be created in that bowl and the brewed coffee in the bowl 3 being subject to atmospheric pressure, will be returned automatically to the bowl 1 through the connections 58, 2 and 33. Thus after the closure of the petcock 41, the operation is entirely automatic, the heat being automatically turned off and the brewed coffee being not only automatically returned to the dispensing bowl, but so automatically returned after a normal infusion period.

After the completion of the coffee making operation as aforesaid, upon merely breaking the seal for the tube 2, the coffee will be ready to be dispensed from the faucet 14. If desired, I may pull the tube 2 out of the seal 60 and leave the parts in that position or bodily remove the tube 2 and the member 58 at this time and leave them off during dispensing. If it is desired to keep the brewed coffee hot, it will also be evident that this may be accomplished by operating the resetting member 160 and setting the actuating member 159 of the switch 107 in the desired heating position. When the brewed coffee in the bowl 1 has been dispensed down to the level of the top of the flange 10, it will also be noted that through the thermostatic member 165, which is set to operate when the pressure plate approaches a dangerous temperature, and the connections 169 and 168, co-operating with this member 165, the switch 107 will again automatically be moved to open circuit position in such manner as to prevent the damage which might otherwise result from continuing to heat the bowl 1 when the same is empty or has only a very small quantity of coffee therein. Here it will also be noted that whenever the switch 107 has been operated automatically to interrupt the current supply to the heating unit by means associated with either bowl, it is necessary to reset the switch 107 by operating the member 165 before the heat can again be turned on by operating the actuating member 159 of the switch 106. Of course, whenever the switches 106 and 107 are closed, the light 156 will also be on.

As a result of my improved construction it will also be noted that the mechanism is very convenient in use not only as regards the supply of water thereto and the drawing off of the brewed coffee, but also as regards cleansing, it being possible to rinse the bowl 1 at any time by simply passing water into the same and withdrawing the rinse water through the faucet. The brewing bowl 3 will, of course, also be cleansed before being refilled with fresh coffee and returned to the device. It is also possible for the whole device to be taken down and cleansed whenever desired, the member 2 and the bowls 1 and 3 and their connections 33 and 58 all being readily separable. It will also be evident that the seals for the tube 2 in addition to being effective during coffee making and regardless of the vertical positions of the bowl 3, may be very readily and quickly broken or connected as desired. On the other hand, the seal for the member 33 will not require removal save during brushing out the bowl 1 and then the member 33 can be readily removed. Attention is also directed to the ready accessibility of all parts within the base upon the removal of the seating members 8 and 62 and the parts below the same, the heating assembly being removable as a unit with the member 8 and the member 69 being free to be lifted out when the member 62 is removed. Practically all of the parts in contact with the coffee being glass, the quality of the coffee is also high, objectionable flavoring of the coffee by metal being thereby minimized. A further advantage, arising both from the arrangement and the use of glass, is that the various steps of the process are so visible as to constitute a continuous source of interest to patrons. These and other advantages of my improved construction will, however, be clearly apparent to those skilled in the art.

While I have in this application specifically described one embodiment which my invention may assume in practice, it will be understood that the same is shown for purposes of illustration, and that the invention may be modified and embodied in various other forms without departing from its spirit or the scope of the appended claims.

What I claim as new and desire to secure by Letters Patent is:—

1. The combination with a coffee maker comprising operatively interconnected water and coffee bowls, of heating means for said water bowl, means for automatically interrupting heating after a predetermined transfer of water from said water bowl to said coffee bowl, and means for automatically terminating infusion in the coffee bowl and effecting the return of the brewed coffee to the water bowl after a normal infusion period.

2. The combination with a coffee maker comprising operatively interconnected water and coffee bowls, of electric heating means for said water bowl, means for automatically interrupting current flow through said heating means after a predetermined transfer of water from said water bowl to said coffee bowl, and stationary means for automatically terminating infusion in said coffee bowl and effecting the return of the brewed coffee to the water bowl after a normal infusion period.

3. The combination with a vacuum type coffee maker comprising operatively interconnected water and coffee bowls including a stationary water bowl, of electric heating means for said water bowl, means for automatically interrupting current flow through said heating means after a predetermined transfer of water from said water bowl to said coffee bowl, and stationary means for automatically returning the brewed coffee from said coffee bowl to said water bowl after a normal infusion period while the latter bowl remains upon said heating means.

4. The combination with a vacuum type coffee maker comprising operatively interconnected water and coffee bowls including a stationary water bowl, of electric heating means for said water bowl, and means for automatically interrupting current flow through said heating means after a predetermined transfer of water from said water bowl to said coffee bowl, said electric heating means having means for effecting cooling of said water bowl operative upon cessation of current flow and while said bowl remains on said heating means, to effect return of the brewed coffee to said bowl after a normal infusion period.

5. The combination with a vacuum type coffee maker having operatively inter-connected water and coffee bowls, of heating means for said water bowl for effecting transfer of liquid therein for infusion in said coffee bowl, and infusion controlling mechanism controlling the temperature of said water bowl and having means for automatically interrupting heating thereof and means for thereafter automatically effecting cooling of said bowl within the limits of a normal infusion to terminate infusion in said coffee bowl.

6. The combination with a vacuum type coffee maker having operatively inter-connected water and coffee bowls, of heating means for said water bowl for effecting transfer of liquid therein for infusion in said coffee bowl, infusion controlling mechanism controlling the temperature of said water bowl and having means for automatically interrupting heating thereof and means for automatically cooling said bowl within the limits of a normal infusion to terminate infusion in said coffee bowl and effect the return of the liquid coffee to said water bowl, and water supply and brewed coffee discharge connections for said water bowl.

7. The combination with a vacuum type coffee maker having operatively inter-connected water and coffee bowls, of electric heating means for said water bowl adapted to effect liquid flow from the latter to effect infusion in said coffee bowl, means for automatically interrupting current flow through said heating means when the liquid in the water bowl has been transferred to the coffee bowl for infusion in the latter, and means for effecting cooling of said water bowl sufficiently quickly to effect the automatic return to said bowl of the brewed coffee when the same has brewed for a normal infusion period in said coffee bowl.

8. The combination with a vacuum type coffee maker having operatively inter-connected water and coffee bowls, of electric heating means for said water bowl, means for automatically interrupting current flow through said heating means when the water in said water bowl has been transferred to said coffee bowl to infuse the coffee therein, means for automatically effecting the return of the brewed coffee from said coffee bowl to said water bowl upon the completion of a normal infusion in the latter, and water supply and brewed coffee discharge connections having a common connection to said water bowl.

9. In combination, a vacuum type coffee maker comprising operatively connected coffee and water bowls, heating means for the water bowl, a support for said heating means having a closure below said heating means for excluding substantial air flow up through the latter, and means for automatically effecting the return of brewed coffee from said coffee bowl to said water bowl within the limits of a normal infusion following cessation of flow of heating medium to said heating means.

10. In combination, a vacuum type coffee maker comprising operatively connected coffee and water bowls, electric heating means for the water bowl, a support for said heating means having closure means below said heating means for excluding substantial cooling air flow up through said heating means to reduce the temperature of said bowl, and means for automatically effecting the return of brewed coffee from said coffee bowl to said water bowl within the limits of a normal infusion following cessation of current flow to said heating means.

11. In combination, a vacuum type coffee maker comprising operatively connected coffee and water bowls, electric heating means for the water bowl, a support for said heating means having a closure below said heating means for excluding substantial air flow up through said closure and heating means to said bowl, and means associated with said heating means and support for automatically effecting the return of brewed coffee from said coffee bowl to said water bowl within the limits of a normal infusion following cessation of current flow to said heating means.

12. The combination with a vacuum type coffee maker comprising operatively connected coffee and water bowls, heating means for said water bowl, and a support for said heating means having a closure below said bowl for inhibiting a substantial induced cooling air flow up through said heating means, of radiation accelerating means associated with said heating means and beneath said water bowl for effecting the automatic return of brewed coffee from said coffee bowl to said water bowl within the limits of a normal infusion following the cessation of flow of heating medium to said heating means.

13. The combination with a vacuum type coffee maker comprising operatively connected coffee and water bowls, electric heating means for said water bowl, and a support for said heating means having a closure below said bowl for inhibiting a substantial induced air flow up through said heating means, of radiation accelerating means associated with said heating means and beneath said water bowl, and means providing during cooling a cooling flow of atmospheric air over said accelerating means and cooperating therewith to effect the automatic return of brewed coffee from said coffee bowl to said water bowl within the limits of a normal infusion following the cessation of current flow through said heating means.

14. The combination with a vacuum type coffee maker comprising operatively connected coffee and water bowls, and electric heating means for said water bowl, of a water bowl support carrying said heating means and having a closure below said water bowl for inhibiting a substantial induced air flow up through said closure means and said heating means, radiation accelerating means associated with said heating means beneath said bowl, and means for providing upon cessation of current flow an induced cooling air flow over said radiation accelerating means expediting the cooling of said water bowl.

15. The combination with a vacuum type coffee maker comprising operatively connected coffee and water bowls, and electric heating means for said water bowl, of a water bowl support carrying said heating means and having a closure below said water bowl inhibiting a substantial induced cooling air flow up through said closure and said heating means, radiation accelerating means for said heating means associated with the same beneath said bowl and spaced from said closure along the axis thereof, and means for providing an induced cooling air flow over said radiation accelerating means upon cessation of current flow.

16. The combination with a vacuum type coffee maker comprising operatively connected water and coffee bowls, of heating means for said water bowl, means automatically responsive upon substantial completion of water transfer from said water bowl to said coffee bowl for cutting off the supply of heating medium to said heating means, and means for effecting the return of the brewed coffee from said coffee bowl to said water bowl within the limits of a normal infusion.

17. The combination with a vacuum type coffee maker comprising operatively connected water and coffee bowls, of heating means for said water bowl, means responsive to a predetermined condition in one of said bowls for automatically cutting off the supply of the heating medium to said heating means, and means for lowering the temperature of said water bowl to effect the return thereto of the brewed coffee in said coffee bowl within the limits of a normal infusion.

18. The combination with a vacuum type coffee maker comprising operatively connected water and coffee bowls, of heating means for said water bowl, means responsive to a predetermined condition in one of said bowls for cutting off the supply of the heating medium to said heating means, and means for thereafter expediting the cooling of said water bowl to expedite the return of the brewed coffee from said coffee bowl to said water bowl.

19. The combination with a vacuum type coffee maker comprising operatively connected water and coffee bowls, of heating means for said water bowl, means responsive to a predetermined condition in one of said bowls for cutting off the supply of the heating medium to said heating means, and means for expediting the cooling of said water bowl to expedite the return of the brewed coffee from said coffee bowl to said water bowl comprising a bowl support having radiation accelerating means and heat dissipating passage means between said bowl support and the atmosphere.

20. The combination with a vacuum type coffee maker comprising operatively connected water and coffee bowls, both exposed to the atmosphere, an electric heating element outside said water bowl for heating the water therein and causing its transfer to said coffee bowl, a circuit for supplying current to said heating element, a switch in the circuit, means automatically responsive upon substantial completion of the transfer of water from said water bowl to said coffee bowl for opening said circuit, and means for thereafter expediting the cooling of said water bowl to expedite the automatic return of the brewed coffee thereto.

21. The combination with a vacuum type coffee maker comprising operatively connected water and coffee bowls, both exposed to the atmosphere, an electric heating element outside said water bowl for heating the water therein and causing its transfer to said coffee bowl, a circuit for supplying current to said heating element, a switch in the circuit, means automatically responsive upon substantial completion of the transfer of water from said water bowl to said coffee bowl for opening said circuit, and means for insuring the return of the brewed coffee from said coffee bowl to said water bowl within the limits of a normal infusion.

22. The combination with a vacuum type coffee maker comprising operatively connected water and coffee bowls, both exposed to the atmosphere, an electric heating element outside said water bowl for heating the water therein and causing its transfer to said coffee bowl, a circuit for supplying current to said heating element, a switch in the circuit, means automatically responsive upon the substantial completion of the water transfer from said water bowl to said coffee bowl for opening said switch, and cooperating controlling means including a temperature responsive device responsive to the temperature in one of said bowls and likewise opening said circuit.

23. In a coffee maker, a plurality of stationary and movable receptacles for liquid and coffee respectively, means for transferring liquid from the former to the latter to effect infusion therein and movement thereof including operative connections between said receptacles and stationary heating means for heating the stationary receptacle, and automatic controlling means for said heating means associated with the movable receptacle.

24. In a coffee maker, a plurality of receptacles including a stationary receptacle and a movable receptacle, and means for transferring liquid from said stationary receptacle to the other to effect movement thereof and the return of the brewed coffee to said stationary receptacle including operative connections between said receptacles, quick cooling heating means for said stationary receptacle, and automatic controlling means for said heating means controlled by the liquid supplied to said movable receptacle.

25. In a coffee maker, a plurality of receptacles including a stationary heating and dispensing receptacle and a movable brewing receptacle, and means for transferring liquid from the former to the latter and returning the brewed coffee to the former including a connection therebetween, quick cooling heating means for the former receptacle, and automatic controlling means for said heating means actuated by said movable brewing receptacle.

26. In a coffee maker, a base, a plurality of laterally offset heating and infusing receptacles thereon, one movable and the other stationary, means including heating means for one of said receptacles and a stationary connection operatively connected between said receptacles for transferring liquid from one receptacle to infuse coffee in the other and effect movement of one receptacle, and automatically operative means for shutting off said heating means controlled by said movable receptacle.

27. In a coffee maker, a base, a plurality of heating and infusing receptacles on said base, one movable relative to the other and the latter stationary, stationary means for transferring liquid from one receptacle to infuse coffee in the movable receptacle and effect movement thereof including stationary heating means on said base for said stationary receptacle and stationary operative connections between said receptacles, and controlling means for said heating means controlled by said movable receptacle.

28. In a coffee maker, a base, a plurality of heating and infusing receptacles on said base, one movable relative to the base and the other stationary on the latter, means for transferring liquid from the stationary receptacle to the other for infusion and then returning the brewed coffee to said stationary receptacle including operative connections between said receptacles and stationary heating means on said base for said stationary receptacle, and controlling means for said heating means controlled by said movable receptacle.

29. A coffee maker comprising a plurality of receptacles spaced apart laterally and having means for transferring heated liquid from one to coffee in another for infusion in the latter and for then transferring the liquid coffee from the latter receptacle to said first mentioned receptacle upon the completion of a normal infusion, and also having the liquid in said receptacles disposed in glass and both transferring operations visible.

30. In a coffee maker, a base, a plurality of interconnected spaced glass bowls supported thereon including a stationary heating bowl and a movable infusing bowl and means for reversely transferring liquid therebetween upon heating and cooling of said heating bowl, heating means for said heating bowl in said base, and controlling means for said heating means likewise in said base and controlled by the liquid delivered to said infusing bowl.

31. In a coffee maker, a base, a plurality of interconnected spaced glass bowls supported thereon including a stationary heating bowl and a movable infusing bowl and means for reversely transferring liquid therebetween upon heating and cooling of said heating bowl, heating means for said heating bowl in said base, and controlling means for said heating means likewise in said base and controlled by the liquid delivered to said infusing bowl, and supplemental controlling means for said heating means controlled by the liquid in said heating bowl.

32. In a coffee maker, a base, a plurality of interconnected spaced glass bowls supported thereon including a stationary heating bowl and a movable infusing bowl and means for reversely transferring liquid therebetween upon heating and cooling of said heating bowl, heating means for said heating bowl in said base, controlling means for said heating means likewise in said base and controlled by the liquid delivered to said infusing bowl, and supply and discharge connections for said stationary bowl likewise in said base.

33. In a coffee maker, a plurality of receptacles, and means for automatically transferring liquid from one to another for infusion in the latter and thereafter automatically returning the liquid including operative connections between said receptacles, electric heating means for one receptacle, a switch controlling the circuit of said heating means, and means including an automatically adjustable switch associated with one of said receptacles for automatically interrupting the current supply to said first mentioned switch.

34. In a coffee maker, a plurality of receptacles, and means for automatically transferring liquid from one to another and thereafter automatically returning the liquid including heating means, a switch controlling the flow through said heating means, means including an automatically adjustable switch controlling the circuit of said first mentioned switch, and means for re-establishing the circuit connections of said first mentioned switch.

35. In a coffee maker, a plurality of receptacles, and means for automatically transferring liquid from one to another and thereafter automatically returning the liquid including heating means, a switch controlling the flow through said heating means, means including an automatically adjustable switch controlling the circuit of said first mentioned switch, and means for re-establishing the circuit connections of said first mentioned switch comprising means for manually actuating said automatically operative switch.

36. In a coffee maker, a plurality of receptacles, means including heating means for transferring heated liquid from one to the other and returning the liquid when said heating means is shut off, automatic control means for said heating means, manually operable means for resetting said control means, and control means operable upon the resetting of the same for maintaining the returned liquid hot.

37. In a coffee maker, a plurality of receptacles, means for transferring liquid from one to the other including heating means, means for effecting return of the liquid including automatic heat controlling means, and manually operable controlling means for maintaining the returned liquid hot.

38. In a coffee maker, a plurality of receptacles, means for transferring liquid from one to the other including heating means, means for effecting return of the liquid including automatic heat controlling means, and manually operable controlling means for maintaining the returned liquid hot including a manually adjustable member and a manually reset member.

39. In a coffee maker, a plurality of receptacles, means for transferring liquid from one to the other including heating means, means for effecting return of the liquid including automatic heat controlling means, manually operable controlling means for maintaining the returned liquid hot, and automatic means for shutting off the heat as the hot liquid is dispensed.

40. In a coffee maker, a plurality of receptacles, means for transferring liquid from one to the other including heating means, means for effecting return of the liquid including an automatically operated switch controlling said heating means, manually operable control means for maintaining the returned liquid hot, and automatic means for shutting off the heat when the returned liquid exceeds a predetermined temperature.

41. In a coffee maker, a plurality of receptacles having operative connections for transferring liquid from one receptacle when the latter is heated to the other and returning the liquid when the heated receptacle is cooled, electric heating means for said receptacle, a switch controlling the current flow through said heating means, a switch controlling the circuit of said first mentioned switch, and means for automatically opening said second switch.

42. In a coffee maker, a plurality of receptacles having operative connections for transferring liquid from one receptacle when the latter is heated to the other and returning the liquid when the heated receptacle is cooled, electric heating means for said receptacle, a switch controlling the current flow through said heating means, a switch controlling the circuit of said first mentioned switch, and a plurality of means for automatically opening said second switch.

43. In a coffee maker, a plurality of receptacles

61. In a coffee maker, a seat support, a concave bowl seat thereon, heating means inside said seat engaging the inside of the concave surface thereof, a heat retaining member below said heating means, said seat, heating means and heat retaining member having means uniting the same into a unit and each also presenting an axial aperture therethrough and fluid connection means disposed coaxially with said apertures and connectible therethrough with a receptacle on said seat.

62. In a coffee maker, a base, a bowl receptacle thereon, a bowl in said receptacle, resilient means supporting said receptacle, and controlling means operable when the weight of liquid in said bowl causes a predetermined compression of said resilient means.

63. In a coffee maker, a base carrying a vertically adjustable bowl receptacle thereon and having an axial aperture below said receptacle, supporting means carried in said axial aperture, and spring means mounted in said supporting means and engaging and supporting said bowl receptacle.

64. In a coffee maker, a bowl having a closed bottom and an open top, a tube extending into the top of said bowl, and supporting means for said tube carrying a plurality of co-operating discs one supporting the other and the latter engaging and supporting said tube.

65. In a coffee maker, a bowl having a closed bottom and an open top, a tube extending into the top of said bowl, and supporting means for said tube carrying a ring member apertured to establish constant communication with the atmosphere and having an axial aperture larger than said tube and a co-operating split ring seated on said first mentioned ring and gripping said tube closing only the axial aperture therein.

66. In a coffee maker, a support, a receptacle mounted thereon for vertical movement relative to said support, a tube extending into said bowl, and means on said support for supporting said tube in the different vertical positions of said bowl.

67. In a coffee maker, a plurality of laterally offset receptacles, sealing means for one of the same carrying a tube, means for establishing communication of the other with the atmosphere and likewise carrying a tube, and means for connecting said tubes.

68. In a coffee maker, a plurality of laterally offset receptacles, sealing means for one of the same carrying a tube, means for establishing communication of the other with the atmosphere and likewise carrying a tube, and means for connecting said tubes comprising a separable connection and sealing connections between the ends thereof and said tubes.

69. In a coffee maker, a plurality of laterally spaced bowls, means on each of the same carrying a tube extending into its bowl, and a connecting member having its opposite ends connected to different tubes.

70. In a coffee maker, a plurality of laterally spaced bowls, means on each of the same carrying a tube extending into its bowl, a connecting member having its opposite ends connected to different tubes above said tube, and seals between the ends of said member and said tubes.

71. In a coffee maker, a stationary receptacle and a vertically movable receptacle, and operative connections for transferring liquid from said stationary receptacle to the other in one position of said movable receptacle and returning it in another position of the latter including quick cooling stationary heating means for the stationary receptacle, and controlling means for said heating means actuated by said vertically movable receptacle.

72. In a coffee maker, stationary and vertically movable receptacles, operative connections for transferring liquid to and from the latter in different positions thereof, electric heating means for the stationary receptacle, and controlling means for said heating means actuated by said vertically movable receptacle and comprising a switch and means for automatically opening the same on vertical movement of said receptacle.

73. In a coffee maker, stationary and vertically movable receptacles, operative connections for transferring liquid to and from the latter in different positions thereof, heating means for the stationary receptacle, and controlling means for said heating means actuated by said vertically movable receptacle and comprising a switch, means for automatically opening the same on vertical movement of said receptacle, and manually operable means for reclosing said switch.

74. In a coffee maker, stationary and veritcally movable receptacles, operative connections for transferring liquid to and from the latter in different positions thereof, heating means for the stationary receptacle, and controlling means for said heating means actuated by said vertically movable receptacle and comprising a pivotally mounted mercury switch, means for automatically tilting the latter to break its circuit upon vertical movement of said receptacle, and manually operable means for tilting said switch to reclose its circuit.

75. In a coffee maker, a plurality of receptacles operatively connected to transfer liquid back and forth, heating means for one of the same, and controlling means for said heating means comprising a switch, means for automatically opening the latter controlled by the liquid supplied to the other receptacle, means for reestablishing current flow, and manually adjustable means for varying said reestablished flow.

76. In a coffee maker, stationary and vertically movable receptacles operatively connected to transfer liquid back and forth, heating means for one of the same, controlling means for said heating means actuated by said vertically movable receptacle and comprising a switch and means for automatically opening the same on vertical movement of said movable receptacle, and automatic controlling means associated with the stationary receptacle for likewise opening said switch.

77. In a coffee maker, stationary and vertically movable receptacles operatively connected to transfer liquid back and forth, heating means for one of the same, controlling means for said heating means actuated by said vertically movable receptacle and comprising a switch and means for automatically opening the same on vertical movement of said movable receptacle, automatic controlling means associated with said stationary receptacle for likewise opening said switch, and manually controlled means for resetting said switch.

78. In a coffee maker, electric heating means, automatically and manually adjustable controlling means connected in the circuit thereof and comprising a plurality of switches both controlling the current flow to said heating means and one manually adjustable and the other automatically adjustable to discontinue heating upon completion of the coffee making operation and having operative connections for transferring liquid from one receptacle when the latter is heated to the other and returning the liquid when the heated receptacle is cooled, electric heating means for said receptacle, a switch controlling the current flow through said heating means, a switch controlling the circuit of said first mentioned switch, a plurality of means for automatically opening said second switch, and manually operable closing means for said second switch.

44. In a coffee maker, a liquid receiving and coffee dispensing receptacle, a co-operating ground coffee containing receptacle having a connection with said first receptacle, heating means for the first mentioned receptacle, and controlling means for said heating means including manually operable controlling means and a plurality of automatically operable controlling means, one of the latter controlling the coffee making operation and the other controlled by the temperature of the heating means.

45. In a coffee maker, a liquid receiving and coffee dispensing receptacle, a co-operating ground coffee containing receptacle having a connection with said first receptacle, heating means for the first mentioned receptacle, and controlling means for said heating means including manually operable controlling means and a plurality of automatically operable controlling means, one of the latter being associated with each receptacle.

46. In a coffee maker, mechanism for making coffee comprising a plurality of receptacles and means for delivering the water from one receptacle to a ground coffee containing receptacle and returning the brewed coffee to said first receptacle to be dispensed, including means for maintaining the coffee in the latter receptacle heated while being dispensed, and means for automatically cutting off the heat when the liquid level drops below a predetermined point.

47. In a coffee maker, mechanism for making coffee comprising a plurality of receptacles and means for delivering the water from one receptacle to a ground coffee containing receptacle and returning the brewed coffee to said first receptacle to be dispensed, including means for maintaining the coffee in the latter receptacle heated while being dispensed, and means for automatically cutting off the heat when the temperature rises above a predetermined point.

48. In a coffee maker, a base, a receptacle thereon, electric heating means thereon beneath said receptacle, and water supply and coffee dispensing connections for said receptacle having separate control means and a common coaxial connection with said receptacle through said heating means.

49. In a coffee maker, a base, a receptacle thereon, electric heating means thereon beneath said receptacle, and water supply and coffee dispensing connections for said receptacle having separate control means, said supply and dispensing connection having a common coaxial connection with said receptacle through said heating means and said receptacle also having an axial portion extending through said heating means into said connection.

50. In a coffee maker, a base having receptacle seat carrying means thereon, a receptacle seat removably carried on said seat carrying means, a heating unit beneath said seat removable bodily with said seat, and means for supplying liquid through said seat and heating unit into a receptacle on said seat.

51. In a coffee maker, a base having receptacle seat carrying means thereon, a receptacle seat carried on said means, a heating unit beneath said seat, said seat and said heating unit each having an axial aperture therein for receiving a projecting axial portion and a receptacle having an axial supply connection extending through said apertures.

52. In a coffee maker, a base having receptacle seat carrying means thereon, a receptacle seat carried on said means, a heating unit beneath said seat, said seat and said unit each having an axial aperture therein, and a liquid supply and discharge connection carried by said base coaxially with said aperture.

53. In a coffee maker, a base having receptacle seat carrying means, a receptacle seat carried on said means, a heating unit beneath said seat, said seat and unit each having an axial aperture therein, a bowl on said seat, an axial supply connection therefor extending through said apertures, and means for connecting said bowl to said connection seating said bowl on said seat.

54. In a coffee maker, a receptacle having a bottom axial aperture, supply and discharge connections connected thereto, electric heating means surrounding said aperture, and terminal connections for said heating means likewise disposed around said aperture.

55. In a coffee maker, a receptacle having a bottom aperture and an open top, valved supply connections to said aperture, means for closing said top having an axial aperture therein, and a tube sealed in said axial aperture and extending into said receptacle.

56. In a coffee maker, a receptacle having an open top, and means for closing said top comprising a plurality of relatively adjustable clamping members carried by said top and carrying sealing means over the latter, and a tube extending axially through said sealing means into said receptacle.

57. In a coffee maker, a bowl having an open top, means for closing said top having an axial aperture therein, a tube sealed in said aperture and extending into said bowl, and valve means carried by said closing means and controlling the pressure in said bowl.

58. In a coffee maker, a bowl having an open top, means for closing said top having an axial aperture therein, a tube sealed in said aperture and extending into said bowl, and valve means carried by said closing means, said closing means comprising a plurality of co-operating sealing members and having both the seal for said tube and said valve carried by the same member.

59. In a coffee maker, a seat support, a concave bowl seat thereon, heating means inside said seat engaging the inside of the concave surface thereof, a heat retaining member spaced from said heating means below the same, and a receptacle on said seat having inlet means extending axially through said elements on said support.

60. In a coffee maker, a seat support, a concave bowl seat thereon, heating means inside said seat engaging the inside of the concave surface thereof, a heat retaining member spaced from said heating means below the same, said seat, heating means and heat retaining member having axial connecting means uniting the same into a unit, and a receptacle on said seat having a fluid connection extending through said connecting means.

render the manually adjustable means inoperative, and means for reestablishing current flow and rendering said manually adjustable means operative.

79. In a coffee maker, electric heating means, automatically and manually adjustable controlling means connected in the circuit thereof and comprising a plurality of switches, both controlling the current flow to said heating means and one manually adjustable and the other automatically adjustable to discontinue heating upon completion of the coffee making operation and render the manually adjustable means inoperative, means for reestablishing current flow and rendering said manually adjustable means operative, and indicating means operative whenever current flows to said heating means.

80. In a coffee maker, electric heating means, automatically and manually adjustable controlling means connected in the circuit thereof and comprising a plurality of switches, both controlling the current flow to said heating means and one manually adjustable and the other automatically adjustable to discontinue heating upon completion of the coffee making operation and render the manually adjustable means inoperative, and means for reestablishing current flow and rendering said manually adjustable means operative, said manually adjustable means also being adjustable to vary the heating effect of said heating means.

81. In combination, a heating unit, a pressure plate therefor, a heat retaining member enclosing and spaced from said pressure plate, and terminal connections for said heating unit carried by said pressure plate projecting through and insulated from said heat retaining member.

82. In combination, a threaded member slotted to receive a conductor, means threaded on said member for clamping said conductor in position thereon, and means threaded on said last mentioned means for connecting a line connection thereto.

83. In combination, a heating unit comprising a plurality of series of series connected heating elements, terminal connections connected to the end elements of each series of elements providing a plurality of independent line connections for each series of elements, and switch mechanism connected to said terminals for selectively connecting said elements in series or all or part thereof in parallel.

84. In combination, a heating unit comprising a plurality of series of series connected heating elements, and terminal connections connected to the end elements of each series of elements, said elements having a common pressure plate carrying said terminals and also a common heat retaining plate spaced from and enclosing said pressure plate and having apertures through which said terminals extend.

FRANK E. WOLCOTT.